Jan. 8, 1952  A. C. WINTERHALTER  2,581,994
CABLE PROVIDED WITH POLARIZED OUTLETS FOR SEISMIC PROSPECTING
Filed April 25, 1946  3 Sheets-Sheet 1
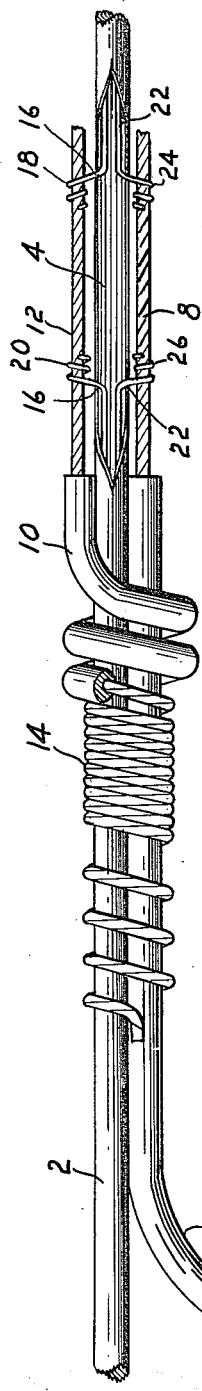
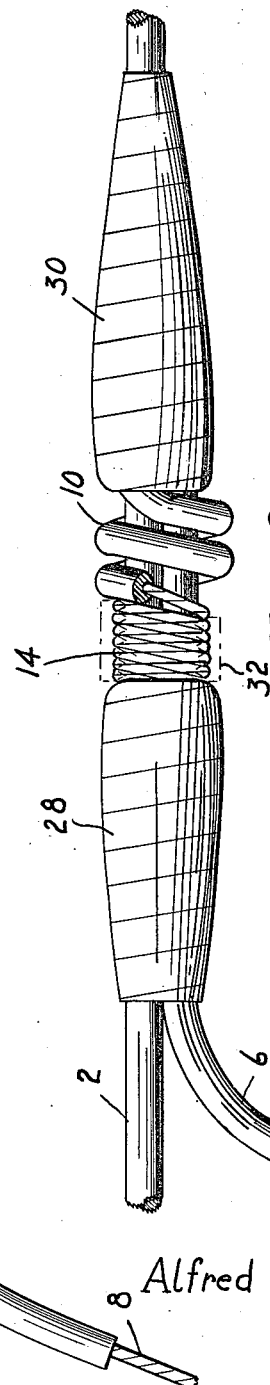
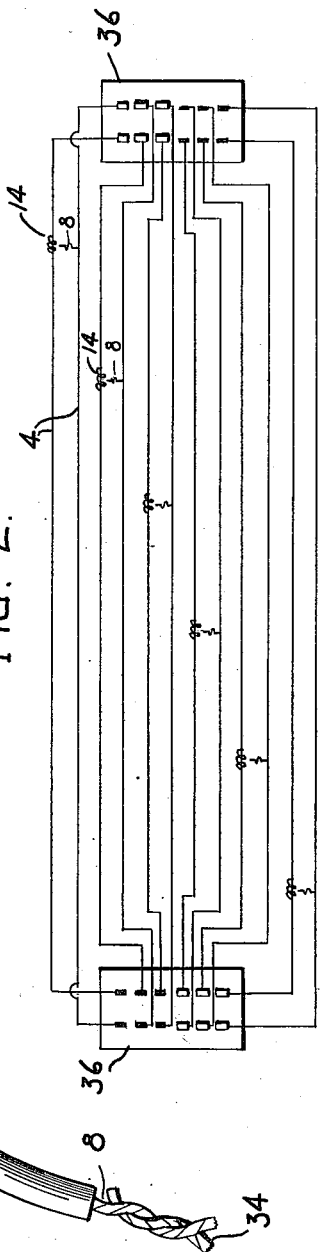
INVENTOR.
Alfred C. Winterhalter
BY
ATTORNEYS Jan. 8, 1952  A. C. WINTERHALTER  2,581,994
CABLE PROVIDED WITH POLARIZED OUTLETS FOR SEISMIC PROSPECTING
Filed April 25, 1946  3 Sheets-Sheet 2
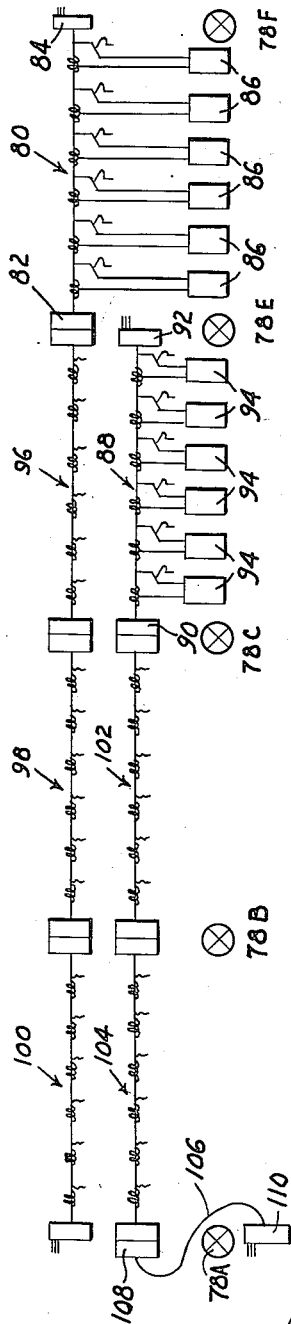
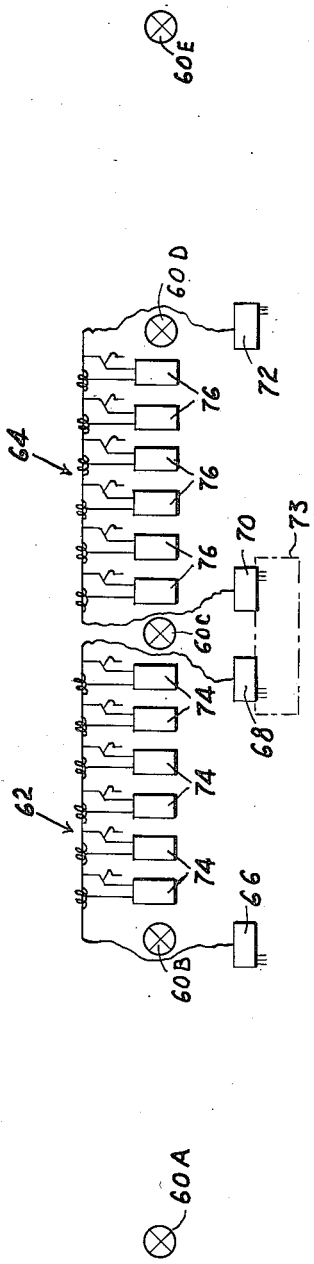
INVENTOR.
Alfred C. Winterhalter
BY
Busser + Harding
ATTORNEYS Jan. 8, 1952   A. C. WINTERHALTER   2,581,994
CABLE PROVIDED WITH POLARIZED OUTLETS FOR SEISMIC PROSPECTING
Filed April 25, 1946   3 Sheets-Sheet 3
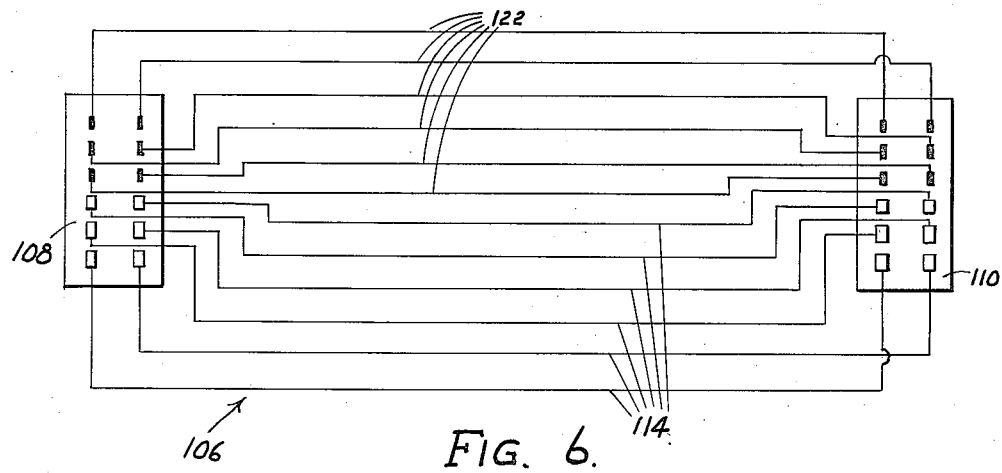
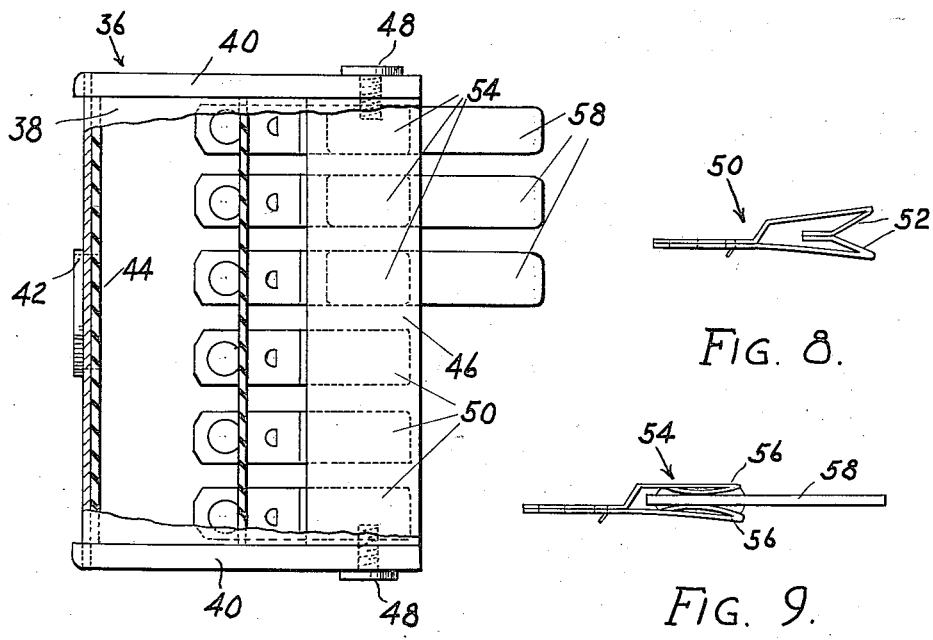
INVENTOR.
Alfred C. Winterhalter
BY
Basore & Hardaway
ATTORNEYS Patented Jan. 8, 1952

2,581,994

UNITED STATES PATENT OFFICE 2,581,994

CABLE PROVIDED WITH POLARIZED OUTLETS FOR SEISMIC PROSPECTING

Alfred C. Winterhalter, Beaumont, Tex., assignor to Sun Oil Company, Philadelphia, Pa., a corporation of New Jersey Application April 25, 1946, Serial No. 664,754

2 Claims. (Cl. 174—72)

This invention relates to seismic prospecting methods and apparatus and has particular reference to an improved method and means for connecting and setting out seismic detecting apparatus.

In seismic prospecting it is customary to proceed in systematic fashion to survey a particular area, usually, in the case of reflection shooting, by choosing shot points arranged in a straight line and locating the detectors with respect to these shot points in systematic fashion not only to secure more readily interpretable results but also to simplify the procedure to minimize errors which would otherwise occur due to the employment of low grade labor. Generally speaking, the successive shot points are used in order along a straight line and when shooting is performed at each point an array of detectors is provided which is symmetrical with respect to the point, the detectors being arranged in the line of the shot points. As heretofore practiced, the surveying is carried out with the recording apparatus in a truck located adjacent to the shot point and lines run from this truck toward the right and left to connect with the detectors. When shooting is to occur at the next shot point, the truck is moved thereto and both lines must be picked up and arranged at the new shot point in the fashion in which they were arranged at the preceding point. Since the successive shot points may be of the order of one thousand feet apart and, for example, six detectors might be used on each side of the shot point spaced, for example, one hundred to two hundred feet apart, it will be evident that considerable labor is involved in each day's work, if, as is customary, ten to twenty set ups may be used per day.

The procedure becomes even more complicated when so-called "remote" recording is necessary as in the case when working in swampy or other regions in which it is impossible to locate the recording truck adjacent to the shot points. In such case, it is necessary to run extension lines from the recording truck to the detector set ups which must be advanced from shot point to shot point as before with suitable provisions made for insuring systematic procedure.

In accordance with the present invention, apparatus is used giving rise to simpler procedures in handling the detector equipment. Involved in the invention are the provisions of improved lines with improved connecting means, the use of special plugs, and an improved systematic procedure. The objects of the invention relating to these matters and to other details will become apparent from the following description, read in conjunction with the accompanying drawings, in which:

Figure 1 is an elevation illustrating a partially completed polarized junction on a line;

Figure 2 is a similar view of the complete junction;

Figure 3 is a diagram illustrating the connections of the cable conductors to plugs;

Figure 4 is a diagram illustrating the fashion in which the detectors and cables are arranged and the system involved in successive shots;

Figure 5 is a similar diagram but illustrating the adaptation of the invention to remote recording;

Figure 6 is a diagram illustrating the wiring of a reversing adaptor;

Figure 7 is an elevation partly broken away showing the details of construction of a plug such as used in connection with the invention;

Figure 8 is an elevation showing the details of a female connecting element; and Figure 9 is a similar view showing the details of a male connecting element.

In order to simplify the description of the invention, there will first be considered certain mechanical elements thereof followed by a description of the lay-outs involving their use.

Referring first to Figures 1 and 2, there is illustrated therein a cable 2 which includes a group of insulated conductors 4 covered by an extruded plastic insulating sheath. For simplicity of description, it may be assumed that each cable is adapted for connection to six detectors so that the cable contains twelve conductors arranged in twisted pairs, one pair for each detector. It will, of course, be evident that similar cables may be arranged for any number of detectors, or for detectors connected in multiple for the practice of what is known in the seismic prospecting art as multiple detection. The various conductors are covered by colored insulation so that they may be readily distinguished and properly connected to end plugs and to the junctions which are similar to the junction illustrated in Figures 1 and 2. The improved junction is of polarized form to insure proper connection. A pigtail 6 is provided by an insulated wire, the wire being indicated at 8. The sheath of the cable is opened and one of the wires 22 therein is brought out, cut, and its ends 24 and 26, from which its insulation is removed, are wrapped about and soldered to one end of the wire 8 of the pigtail. A second length of insulated wire 10 has its insulation removed from its conductor ends 12 and 14 and the end 12 has soldered to it the twisted ends 18 and 20 resulting from the opening and removal of insulation from the other conductor 18 forming a pair with the conductor 22. The insulated portion of the wire 10 and the other end thereof are then wrapped as indicated about the cable 2 and the insulated portion of the pigtail 6, as illustrated in Fig. 1, and the close turns are covered with solder. Finally, tape, as indicated at 28 and 30, is wrapped about the end turns of the end 14 and about the exposed connections with the conductors 16 and 22, as indicated, with the final result that the junction presents for connection one end of the wire of the pigtail and the substantially cylindrical conductor formed by the soldered turns at 14. Connection of a detector to this junction is then effected by a clip indicated at 32, which clamps over the exposed wire 14, and the conductor end 34 which may be twisted with the pigtail conductor 8. By reason of this arrangement, it will be evident that it is substantially impossible for a workman to make a mistake in effecting proper connections of a detector to the junction.

Junctions similar to the one described above are located along the cable at the desired spacing of the detectors at intervals, for example, of the order of one hundred to two hundred feet apart. The pigtail and clamp connections are indicated for the various pairs of cable conductors in Figure 3.

The ends of the cable conductors are connected to plugs indicated generally at 36, the mechanical details of construction of which are shown in Figures 7, 8 and 9. Each of these plugs comprises a U-shaped housing 38 with ends 40 secured thereto so as to leave open the right hand end as viewed in Figure 7. An opening 42 in the opposite end wall provides passage for the cable and the interior of the casing is insulated as indicated at 44. An insulating block 46 closes the open end of the casing being secured in position by screws 48. The block 46 contains suitable openings for the reception of connector elements. Except for the arrangement of these elements, the plug is conventional. The female elements of the plug are as illustrated in Figure 8 at 50 including the prongs 52, these elements being of conventional construction. The male elements are as illustrated at 54 in Figure 9 and comprise prongs 56 between which is soldered a prong 58 arranged to project from the block 46. As illustrated in Figure 3, each plug contains three pairs of male elements and three pairs of female elements which are connected to the ends of the cable as indicated in that figure. It will be evident that when these plugs are connected in corresponding sockets, which may be of identical construction, connected to the recorder, the junctions will have a definite sequence in relation to the recording channels irrespective of which end of the cable may be connected to the recorder, i. e., the nearest junction will be connected to a particular recorder channel and so on.

Reference may now be made to Figure 4 for a description of the procedure involved in running a profile when the recording truck may be located adjacent to the point at which the shot is fired.

A series of shot points successively used are indicated at 60A to 60E, inclusive and the set-up is illustrated as involving the firing of the shot at point 60C. The cables 62 and 64 are laid out between the shot points having their plugs 66, 68, 70 and 72 located adjacent to the three shot points 60B, 60C and 60D as indicated. The plugs 68 and 70 adjacent to the point 60C are plugged into the recording apparatus 73 which may be carried by the truck. The detectors 74 and 76 are connected to the cables and are properly spaced at the desired points between the shot points in the usual fashion. Following completion of shooting at the shot point 60C, it is, in accordance with the invention, necessary to move only one of the cables and attached detectors, namely, the cable 62 and its associated detectors which are then moved to extend between the shot points 60D and 60E, i. e., to the right of the shot point 60D at which shooting is next to occur. In doing this, the line is reeled after detaching the detectors. As will be evident from the diagram in Figure 3, it will be immaterial which end of the cable 62 is located at the shot point 60D, since in any case, the polarization of the plugs is such that the detectors will be automatically connected to the proper channels in sequence. In order to effect the recording, therefore, it is only necessary to plug into the recording device 73 the plug 72 and either the plug 66 or 68 which happens to be adjacent to the shot point 60D.

The same sequence may be followed throughout the entire operation, the left hand cable and its detectors being merely moved at each change of position to the right of the shot point, while the cable and its attached detectors which were at the right of the preceding shot point need not be disturbed, since they will now be at the left of the new shot point. As will be evident, the arrangement cuts almost in half the labor required in shifting from one shot point to the other, inasmuch as at each shift, one of the cables and its detector set are undisturbed. It will also be evident that due to the plug arrangement which makes immaterial the possible interchange of cable ends, and due to the polarized nature of the cable junctions to the detectors, it is quite impossible for even the most unskilled labor to make any errors in arrangement.

In Figure 5, there is illustrated the arrangement which is used in remote recording. Assume, for example, a series of shot points 78A to 78F, inclusive, which, with the exception of 78A, are inaccessible to the recording truck so that it is necessary to keep the truck adjacent to the point 78A. In such case, a group of cables of identical type and as previously described, may be used to reach the remote shot points, such, for example, as 78E at which it may be assumed that shooting is to occur. In such case, the cable 80 to the right of this shot point and to which the detectors 86 are connected has its plug 82 connected through a series of cables 96, 98 and 100 back to the truck, the plugs on the adjacent ends of the cables being connected. The plug 84 on the right hand end of the cable 80 is left unconnected.

The cable 88 to which the detectors 94 are connected is likewise joined to the recording apparatus in the truck through cables 102 and 104. However, in this case, between the left hand plug of the cable 104 and the recording apparatus, there is a reversing adaptor indicated generally at 106 and having the construction illustrated in Fig. 6. This consists merely of two plugs 108 and 110 connected by a short length of cable, the conductors 122 which are connected to the male elements, while the conductors 114 are connected to the female elements of both the plugs 108 and 110. The rule which is to be followed is merely that the line connected to the detectors at the left hand side of the shot point must be connected to the recording apparatus through this reversing adaptor, while the line connected to the right hand detectors may be plugged directly into the recorder.

Following the shooting at the point 78E, the change for shooting at point 78F is quite simple. The cable 88 remains in position and two additional cable lengths are connected in series to its right hand plug 92, the farthest of these cables then lying to the right of shot point 70F. The detectors 94 are then connected to this cable. The detectors 86 and the entire cable arrangement connected therewith remain unchanged. It is only necessary now to change the adaptor 100 to the other cable line, since its detectors are now lying to the left of the new shot point.

It will be evident from the above description that every other one of the cables in this arrangement may, if desired, be a plain cable without junction connections. Generally speaking, however, it may be convenient to carry only one type of cable and, consequently, all of the cables have been illlustrated as provided with junctions. It will be evident that a systematic procedure is involved which will, at all times, connect to the proper recording channels the detectors which bear corresponding relationships to the shot points.

What I claim and desire to protect by Letters Patent is:

1. A cable assembly for seismic prospecting comprising a cable containing a plurality of pairs of conductors, a plurality of polarized outlets distributed in spaced relation along the length of said cable, each of said outlets being associated with one of said pairs of conductors and comprising a conductor connected to one conductor of its pair and wrapped about the cable to present an approximately cylindrical exposed contact, and a pigtail connected to the other conductor of its pair, each of said outlets being connected to one of said pairs of conductors.

2. A cable assembly for seismic prospecting comprising a cable containing a plurality of pairs of conductors, a plurality of polarized outlets distributed in spaced relation along the length of said cable, each of said outlets being associated with one of said pairs of conductors and comprising an outlet conductor connected to one conductor of its pair and wrapped about the cable to present an approximately cylindrical contact, and a pigtail connected to the other conductor of its pair, said conductors of the pair being parted at the location of the outlet with their ends at the parting being connected to, and electrically joined by the respective outlet conductor and pigtail.

ALFRED C. WINTERHALTER.

REFERENCES CITED

The following references are of record in the file of this patent:

UNITED STATES PATENTS

| Number | Name | Date |
|---|---|---|
| 956,186 | Schroeder | Apr. 26, 1910 |
| 1,028,260 | Murray | June 4, 1912 |
| 1,909,205 | McCollum | May 16, 1933 |
| 2,124,207 | Neesen | July 19, 1938 |
| 2,166,420 | Robertson | July 18, 1939 |
| 2,241,428 | Silverman | May 13, 1941 |
| 2,253,830 | Winterhalter | Aug. 26, 1941 |
| 2,299,140 | Hanson | Oct. 20, 1942 |
| 2,354,548 | Ricker | July 25, 1944 |
| 2,390,187 | Sharpe | Dec. 4, 1945 |